United States Patent
Eng et al.

(10) Patent No.: US 6,524,034 B2
(45) Date of Patent: Feb. 25, 2003

(54) TOOL TIP AND TOOL BODY ASSEMBLY

(75) Inventors: Jörgen Eng, Sandviken (SE); Sven Engstrand, Sandviken (SE); Jonas Svensson, Gävle (SE); Anna Hedberg, Sandviken (SE)

(73) Assignee: Sandvik AB (SE)

( * ) Notice: Subject to any disclaimer, the term of this patent is extended or adjusted under 35 U.S.C. 154(b) by 0 days.

(21) Appl. No.: 09/735,490

(22) Filed: Dec. 14, 2000

(65) Prior Publication Data

US 2001/0018013 A1 Aug. 30, 2001

(30) Foreign Application Priority Data

Dec. 21, 1999 (SE) .............................. 9904709

(51) Int. Cl.$^7$ ............................... B23B 51/02
(52) U.S. Cl. .................. 408/59; 408/144; 408/226; 408/230; 408/233; 408/713
(58) Field of Search ........................ 408/57, 59, 144, 408/226, 227, 230, 233, 713

(56) References Cited

U.S. PATENT DOCUMENTS

| | | | | |
|---|---|---|---|---|
| 1,746,716 A | * | 2/1930 | Sasse | 408/226 |
| 2,259,611 A | * | 10/1941 | Burger | 408/703 |
| 2,849,926 A | * | 9/1958 | Burgsmuller | 409/74 |
| 3,368,257 A | * | 2/1968 | Andreasson | 408/144 |
| 3,621,754 A | * | 11/1971 | Ditson | 409/74 |
| 4,043,697 A | * | 8/1977 | Eckle | 408/233 |
| 4,612,832 A | * | 9/1986 | Ushigoe et al. | 29/36 |
| 4,632,609 A | * | 12/1986 | Johne | 408/713 |
| 4,684,298 A | | 8/1987 | Roos | |
| 4,950,108 A | | 8/1990 | Roos | |
| 5,810,518 A | | 9/1998 | Wilman et al. | |
| 5,863,162 A | * | 1/1999 | Karlsson et al. | 408/233 |
| 5,944,462 A | * | 8/1999 | Woodward | 408/211 |
| 5,947,660 A | | 9/1999 | Karisson | |
| 6,241,433 B1 | * | 6/2001 | Rydberg et al. | 408/233 |

FOREIGN PATENT DOCUMENTS

| | | | |
|---|---|---|---|
| DE | 34 48 086 C2 D E | 8/1985 | |
| EP | 3580901 A1 * | 3/1990 | 408/144 |
| JP | 191709 A * | 9/1985 | 408/713 |

OTHER PUBLICATIONS

"Vardex Single Point and Multitooth Threading Tools", Printed in Israel (date believed to be approximately 1980, pp. 23–24.

* cited by examiner

Primary Examiner—Daniel W. Howell
(74) Attorney, Agent, or Firm—Burns, Doane, Swecker & Mathis, L.L.P.

(57) ABSTRACT

A tool tip and tool body assembly includes a tool tip having a first end for contacting a workpiece and a second end, the second end having a patterned surface of recesses and protrusions, and at least one through hole extending through the tool tip from the second end. A tool body has a first end having a patterned surface corresponding to the patterned surface of the tool tip for mating with the patterned surface of the tool tip, and at least one threaded hole adapted to align with the at least one through hole in the tool tip. At least one fastener having a threaded end and a securing end is provided, the fastener extending through the at least one through hole such that the securing end abuts against a surface in the at least one through hole, the threaded end mating with threads in the threaded hole. Torque is transmitted between the tool tip and the tool body solely by the at least one fastener and the patterned surface of the tool tip and the patterned surface of the tool body.

15 Claims, 4 Drawing Sheets

TOOL TIP AND TOOL BODY ASSEMBLY

FIELD OF THE INVENTION

The present invention relates to tool tip and tool body assemblies.

BACKGROUND AND SUMMARY

It is known to provide a separate and replaceable tool tip for attachment to a tool body. For example, it is known to provide a drill bit in the form of a drill bit tip that is attachable to a drill bit body. It is also possible to provide such an arrangement in a milling or boring tool, such as in a ball nose end mill. The drill bit tip may be made of a harder material than the drill bit body because the drill bit tip tends to be exposed to the greatest forces. The drill bit body may be made of a less hard, and typically less expensive material. Because the drill bit tip can comprise a relatively small percentage of the total amount of material making up the drill bit, the overall expense of the drill bit can be minimized. Moreover, the expected life of the drill bit having a harder drill bit tip can be enhanced relative to drill bits made entirely of softer material. The cost of replacing a harder drill bit tip will typically be lower than the cost of replacing an entire drill bit made of the same material as the drill bit tip. U.S. Pat. Nos. 4,950,108 and 4,684,298 disclose drill assemblies including a drill body and a replaceable drill bit tip and are incorporated by reference herein.

Typically, the drill bit tip and the drill bit body are secured together by one or more, usually two, fasteners, such as bolts or screws extending through holes in the drill bit tip into threaded holes in the drill bit body. Because torsional forces transmitted between the drill bit tip and the drill body tend to be high, it is necessary to use relatively large fasteners on the assembly. The use of large fasteners results in a loss of surface area at the tip of the drill bit tip, and can interfere with the operation of the drill. Moreover, the use of large fasteners makes it difficult to enjoy the advantages of a separate hard drill bit tip and softer drill bit body in drill bits of small sizes or even in drill bits of larger sizes that are intended for use in drilling hard materials. Further still, it is often necessary to provide bushings in the drill bit tip to avoid excessive play between the drill bit tip and the drill bit body during operation. It is desirable to provide a tool tip and tool body assembly that permits the use of small fasteners to secure together the tool tip and the tool body, yet still permits transmission of torque between the tool tip and the tool body to the same or a greater degree than assemblies wherein larger fasteners are used, and avoids problems of excessive play between the tool tip and the tool body.

Swedish Patent Application No. 9501687-9 discloses a drill body and separate drill bit tip assembly wherein the drill bit tip is secured to the drill body by a central bolt extending through the drill body. The drill bit tip is provided with an internal thread for mating with the bolt. Facing surfaces of the drill bit tip and the drill body are provided with mating parallel grooves and ridges. It is desirable to provide a tool tip and tool body assembly that does not require a central bore through the tool body.

In accordance with an aspect of the present invention, a tool tip and tool body assembly is provided. The tool tip has a first end for contacting a workpiece and a second end, the second end having a patterned surface of recesses and protrusions, and at least one through hole extending through the tool tip from the second end. The tool body has a first end having a patterned surface corresponding to the patterned surface of the tool tip for mating with the patterned surface of the tool tip, and at least one threaded hole adapted to align with the at least one through hole in the tool tip. At least one fastener having a threaded end and a securing end is provided, the fastener extending through the at least one through hole such that the securing end abuts against a surface in the at least one through hole, the threaded end mating with threads in the threaded hole. Torque is transmitted between the tool tip and the tool body solely by the at least one fastener and the patterned surface of the tool tip and the patterned surface of the tool body.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
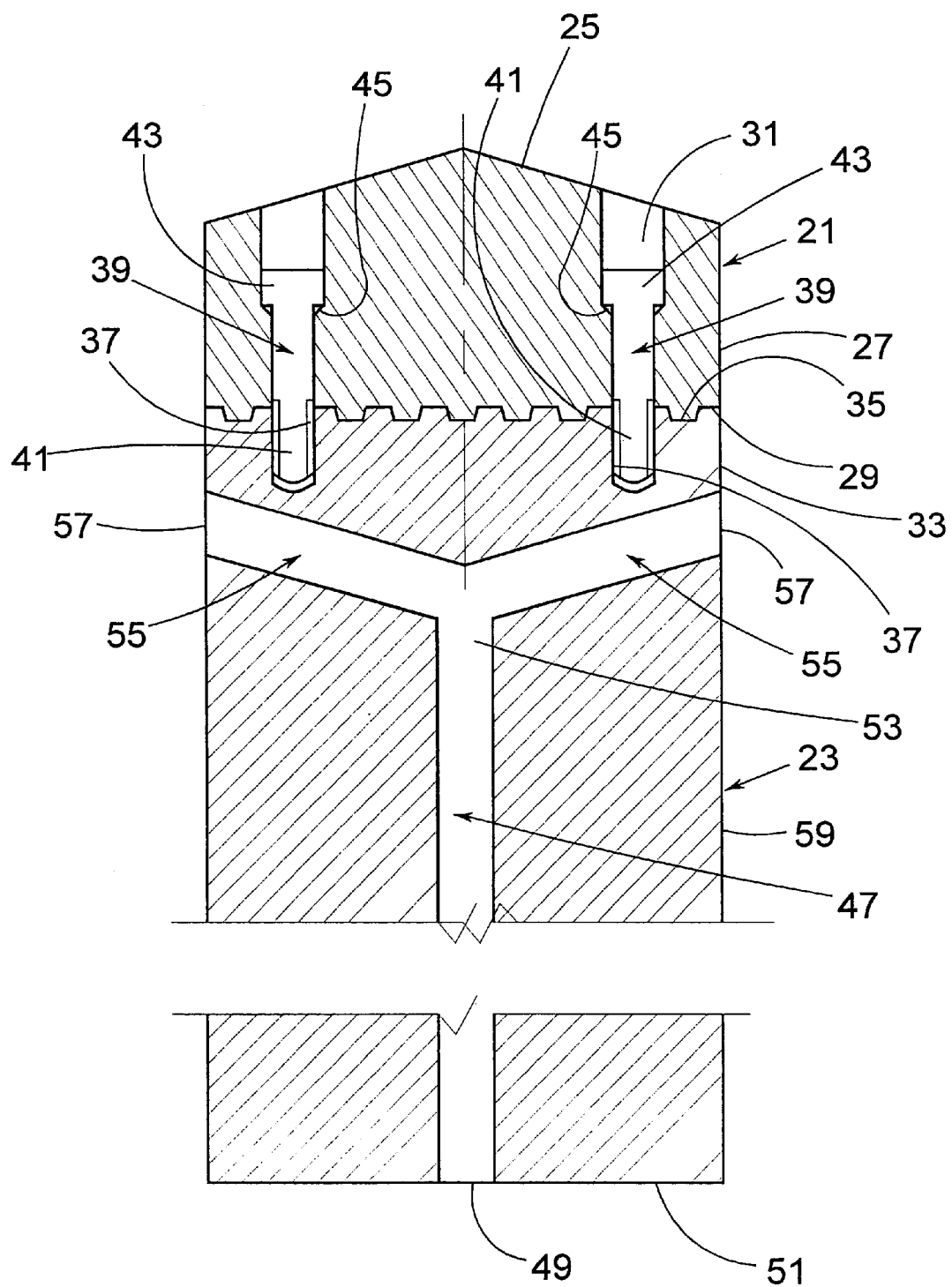
FIG. 1 is a schematic, side cross-sectional view of a tool tip and tool body assembly according to an embodiment of the present invention.

An embodiment of an assembly comprising a tool tip 21 and tool body 23 is shown in cross-section in FIG. 1. The tool tip 21 has a first end 25 for contacting a workpiece and a second end 27. The second end 27 has a patterned surface 29 of recesses and protrusions, and at least one through hole 31 extending through the tool tip from the second end. Preferably, the through hole 31 is parallel to a central axis of the tool tip.

The tool body 23 has a first end 33 having a patterned surface 35 corresponding to the patterned surface 29 of the tool tip for mating with the patterned surface of the tool tip. Preferably, recesses and protrusions of the patterned surface 29 of the tool tip 21 mate with protrusions and recesses, respectively, of the patterned surface 35 of the tool body 23. The tool body 23 further includes at least one threaded hole 37 adapted to align with the at least one through hole 31 in the tool tip 21.

At least one fastener 39 having a threaded end 41 and a securing end 43 is provided. The fastener 39 extends through the at least one through hole 31 such that the securing end 43 abuts against a surface 45 in the at least one through hole, and the threaded end 41 mates with threads in the threaded hole 37. Preferably, two through holes 31, two threaded holes 37, and two fasteners 39 are provided as shown in FIG. 1. The through hole 31 in the tool tip 21 is preferably a countersunk hole having a larger portion 31' and a smaller portion 31" and a transition surface 45 between the larger portion and the smaller portion against which the securing end of the at least one fastener 39 abuts. The through holes 31 and the threaded holes 37 are preferably arranged at equal radii from a central axis of the tool tip and the tool body, respectively, and define an angle of 180° measured from the central axis.

In the tool tip 21 and tool body 23 assembly according to the present invention, torque is transmitted between the tool tip and the tool body solely by the at least one fastener 39 and contact between the recesses and protrusions of the patterned surface 29 of the tool tip and the patterned surface 35 of the tool body. The provision of the patterned surface facilitates transmission of substantially greater torque than can be provided with two screws alone and, as a result, permits use of smaller screws, providing more of a working surface at the first end 25 of the tool tip.

Figure 2:
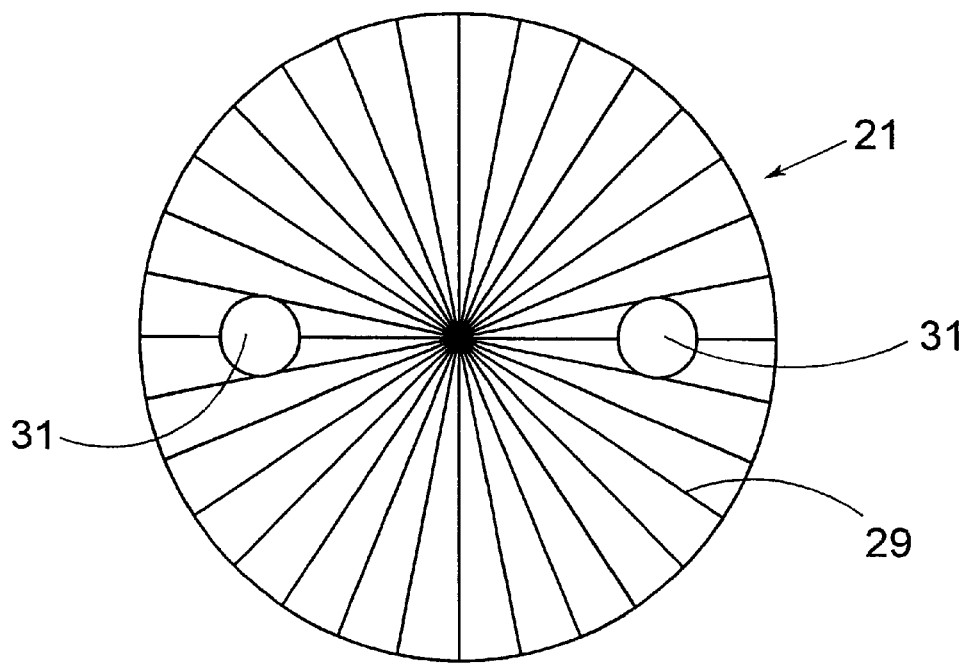
FIG. 2 is a bottom view of a tool tip according to an embodiment of the present invention.
Figure 3:
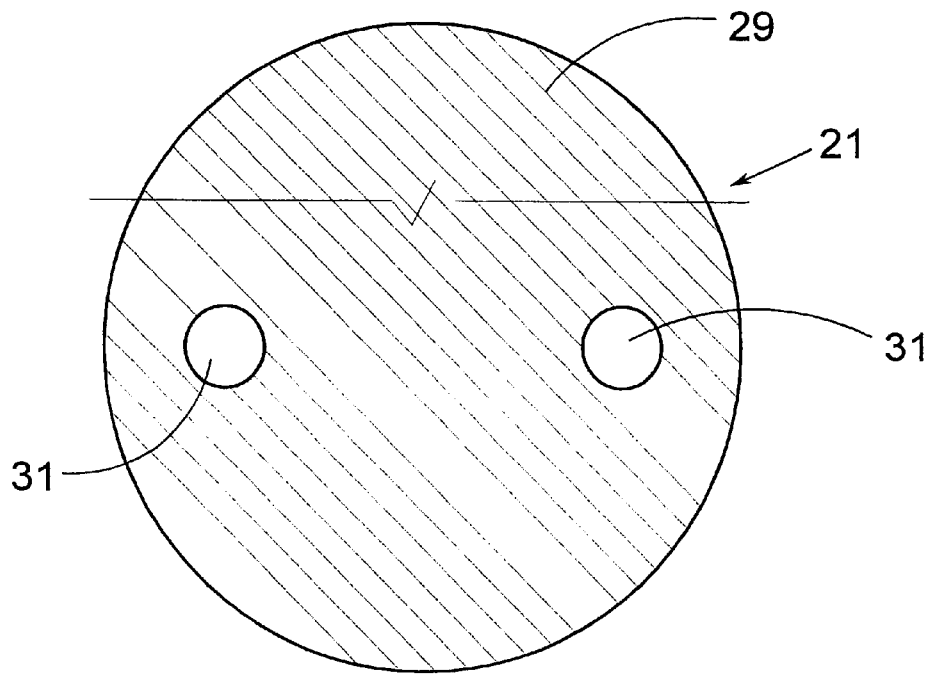
FIG. 3 is a bottom view of another embodiment of the tool tip according to the present invention.

FIG. 2 shows an embodiment of the patterned surface 29 of the tool tip 21. It will be appreciated that the patterned surface 35 of the tool body 23 will preferably be the mirror image of the patterned surface 29 of the tool tip. The patterned surface 29 is in the form of a plurality of radial recesses and protrusions, extending from a central axis of the tool tip 21. FIG. 3 shows an alternative embodiment wherein the patterned surface 29 is in the form of a plurality of parallel recesses and protrusions. Any number of suitable patterns may be provided for the patterned surfaces 29 and 35, such as herringbone patterns, curved patterns, and the like, provided the patterns facilitate transmission of torque during use of the tool tip 21 and tool body 23 assembly. A completely circular pattern centered on the central axis of the tool tip and tool body would likely be least suitable for transmitting torque, because torsional forces from a circular protrusion on of the tool tip and the tool body would not be opposed by torsional forces on the other one of the tool tip and the tool body, or would only be opposed at certain points due to deformation of the pattern during operation..

As seen in FIG. 1, the tool body 23 may be provided with a first passage portion 47 having a first end 49 at a second end 51 of the tool body and a second end 53 at a point removed from the first end 33 of the tool body. The tool body 23 may further be provided with a second passage portion 55 extending from the second end 53 of the first passage portion 47 to a point 57 on a side surface 59 of the tool body. The first and second passage portions 47 and 55 together define a passage and are of sufficient size to provide a lubricant or coolant through the passage.

Figure 4:
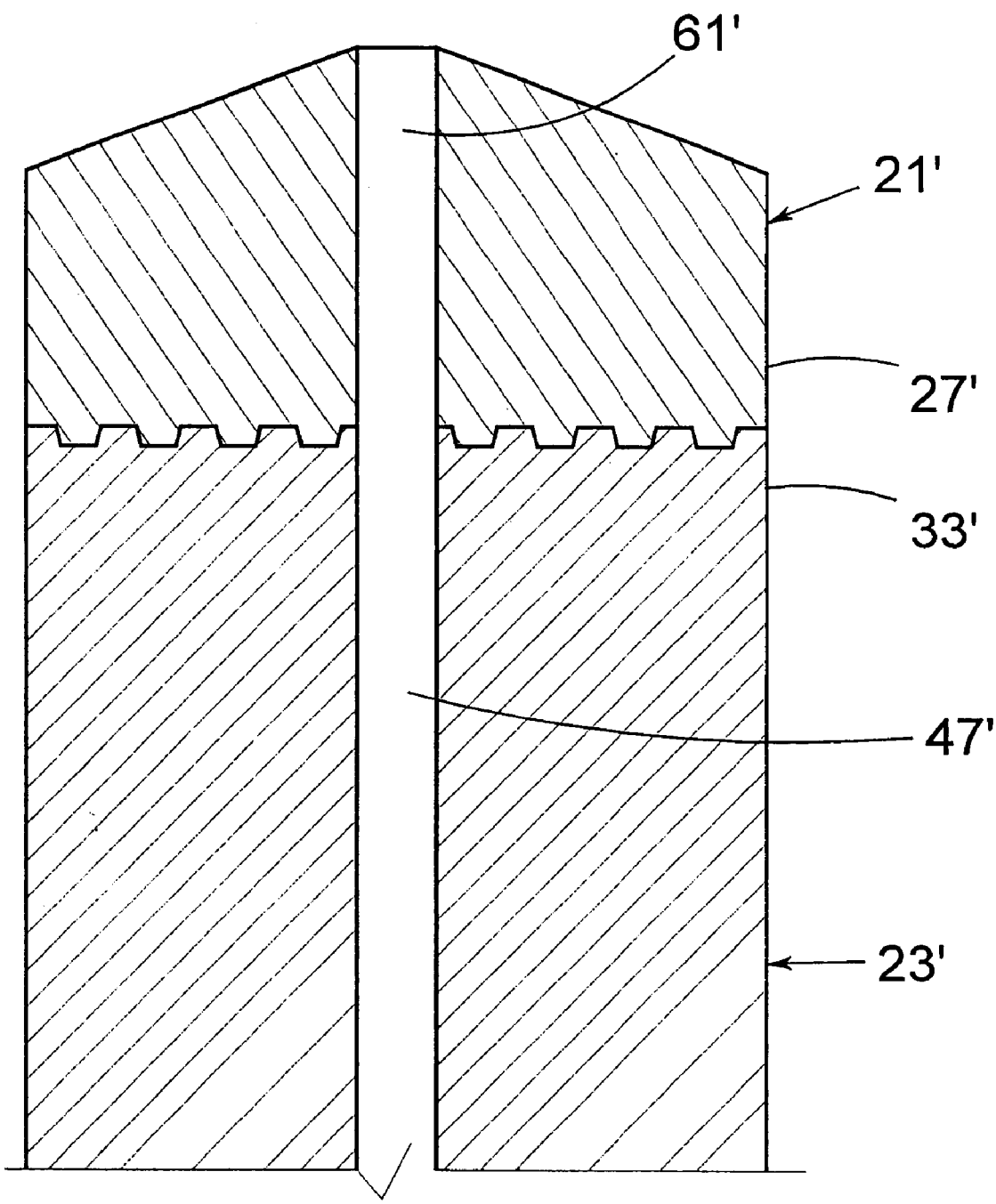
FIG. 4 is schematic, side cross-sectional view of another embodiment of a tool tip and tool body assembly according to the present invention.
Figure 5:
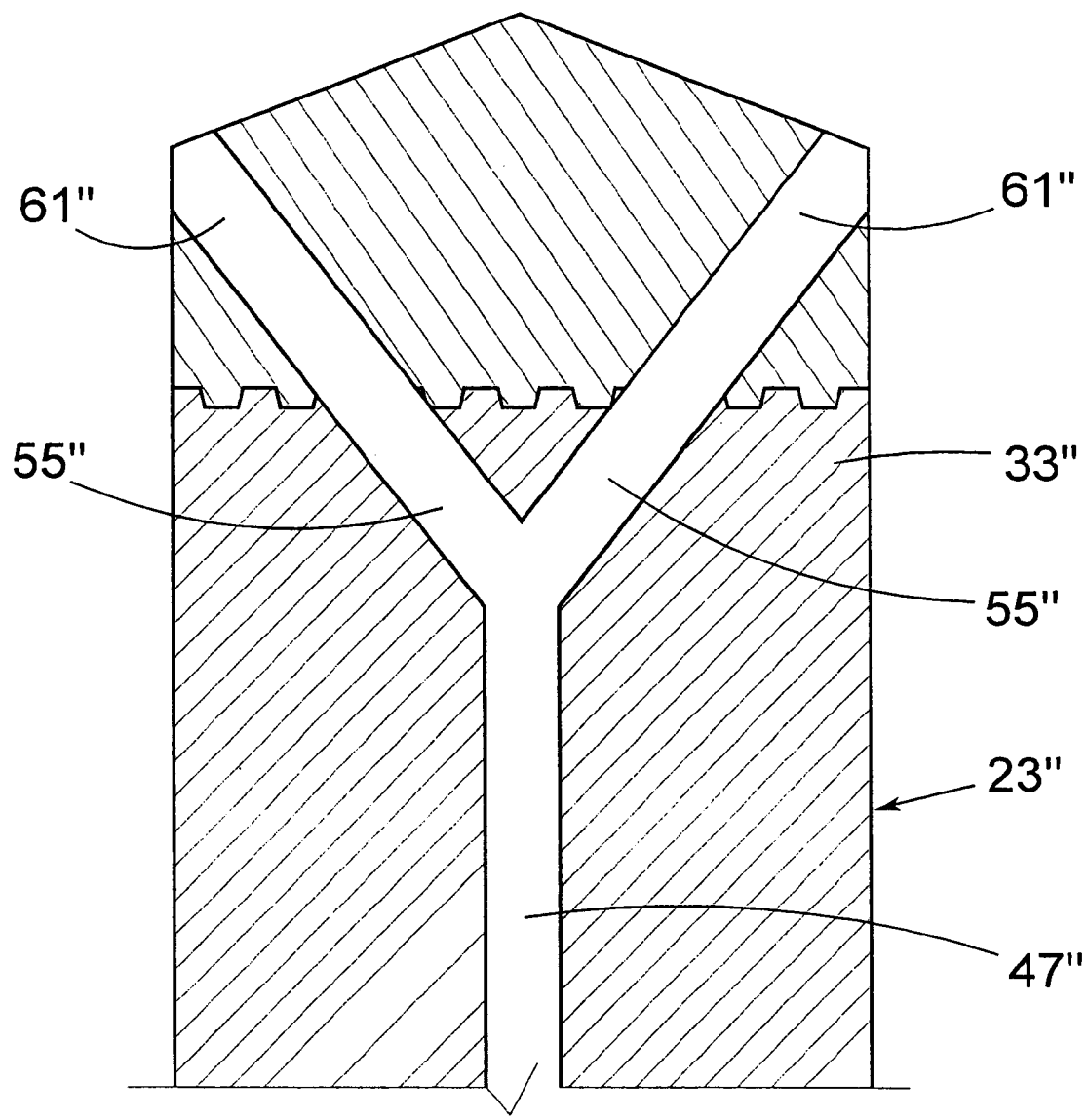
FIG. 5 is a schematic, side cross-sectional view of yet another embodiment of a tool tip and tool body assembly according to the present invention.

As seen in FIG. 4, it is also possible to provide a lubricant or coolant to a point proximate the tool tip 21' by providing one or more through holes 61' through the tool tip that extend to the second end 27" of the tip. The through holes 61' can be aligned with a first passage portion 47' extending to the first end 33' of the body 23' or, as seen in FIG. 5, the body 23" can have a first passage portion 47" with one or more second passage portions 55" extending at an angle from the first passage portion 47" to the first end 33" of the body 23" and that are aligned with one or more through holes 61" extending through the tool tip 21".

The tool tip 21 and tool body 23 may be a drill bit tip and body, a milling bit tip and body, a boring tool tip and body, or any other desired type of tool, preferably a rotating-type tool. Preferably, the tool tip 21 has a higher hardness than the tool body 23 so that the tool tip and body assembly will last longer than a tool made entirely of the material from which the tool body is made.

While this invention has been illustrated and described in accordance with a preferred embodiment, it is recognized that variations and changes may be made therein without departing from the invention as set forth in the claims.

What is claimed is:

1. A tool tip and tool body assembly, comprising:
   a tool tip having a first end for contacting a workpiece and a second end, the second end consisting essentially of a patterned surface of recesses and protrusions and at least one through hole extending through the tool tip from the second end;
   a tool body having a first end consisting essentially of a patterned surface corresponding to the patterned surface of the tool tip for mating with the patterned surface of the tool tip and at least one threaded hole adapted to align with the at least one through hole in the tool tip; and
   at least one fastener having a threaded end and a securing end, the fastener extending through the at least one through hole such that the securing end abuts against a surface in the at least one through hole, the threaded end mating with threads in the threaded hole,
   wherein the at least one through hole, the at least one threaded hole, and the at least one fastner are offset from a central axis of the tool tip and the tool body, and torque is transmitted between the tool tip and the tool body solely by both the at least one fastener and the patterned surface of the tool tip and the patterned surface of the tool body.

2. A tool tip and tool body assembly, comprising:
   a tool tip having a first end for contacting a workpiece and a second end, the second end consisting essentially of a patterned surface of recesses and protrusions and at least one through hole extending through the tool tip from the second end;
   a tool body having a first end consisting essentially of a patterned surface corresponding to the patterned surface of the tool tip for mating with the patterned surface of the tool tip and at least one threaded hole adapted to align with the at least one through hole in the tool tip; and
   at least one fastner having a threaded end and a securing end, the fastener extending through the at least one through hole such that the securing end abuts against a surface in the at least one through hole, the threaded end mating with threads in the threaded hole,
   wherein torque is transmitted between the tool tip and the tool body solely by both the at least one fastner and the patterned surface of the tool tip and the patterned surface of the tool body, and wherein the patterned surface of the tool tip and the patterned surface of the tool body include a plurality of radial recesses and protrusions extending from a center of the tool tip and the tool body to an outer periphery of the tool tip and the tool body.

3. A tool tip and tool body assembly, comprising:
   a tool tip having a first end for contacting a workpiece and a second end, the second end consisting essentially of a patterned surface of recesses and protrusions and at least one through hole extending through the tool tip from the second end;
   a tool body having a first end consisting essentially of a patterned surface corresponding to the patterned surface of the tool tip for mating with the patterned surface of the tool tip and at least one threaded hole adapted to align with the at least one through hole in the tool tip; and
   at least one fastner having a threaded end and a securing end, the fastener extending though the at least one through hole such that the securing end abuts against a surface in the at least one through hole, the threaded end mating with the threads in the threaded hole,
   wherein torque is transmitted between the tool tip and the tool body solely by both the at least one fastner and the patterned surface of the tool tip and the patterned surface of the tool body, and wherein the patterned surface of the tool tip and the patterned surface of the tool body include a plurality of parallel recesses and protrusions.

4. The tool tip and tool body as set forth in claim 1, wherein the tool body includes a first passage portion having a first end at a second end of the tool body and a second end at a point removed from the first end of the tool body, and a second passage portion extending from the second end of the first passage portion to a point on a side surface of the tool body, the first and second passage portions defining a passage and being of sufficient size to provide a lubricant or coolant through the passage.

5. A tool tip and tool body assembly, comprising:
 a tool tip having a first end for contacting a workpiece and a second end, the second end consisting essentially of a patterned surface of recesses and protrusions, at least one through hole extending through the tool tip from the second end, and an end of at least one first passage portion;
 a tool body having a first end consisting essentially of a patterned surface corresponding to the patterned surface of the tool tip for mating with the patterned surface of the tool tip, at least one threaded hole adapted to align with the at least one through hole in the tool tip, and an end of at least one second passage portion adapted to align with a corresponding one of the at least one first passage portion to form at least one passage; and
 at least one fastener having a threaded end and a securing end, the fastener extending through the at least one through hole such that the securing end abuts against a surface in the at least one through hole, the threaded end mating with threads in the threaded hole,
 wherein the at least one through hole, the at least one threaded hole, and the at least one fastner are offset from a central axis of the tool tip and the tool body, and torque is transmitted between the tool tip and the tool body solely by both the at least one fastener and the patterned surface of the tool tip and the patterned surface of the tool body.

6. The tool tip and tool body as set forth in claim 5, wherein at least one of the at least one second passage portions has a first end at a second end of the tool body and a second end at the first end of the tool body, and at least one of the at least one first passage portions extends from the second end of the tool tip and is aligned with the at least one of the at least one second passage portions to a point removed from the second end of the tool tip, each set of aligned first and second passage portions defining a passage of sufficient size to provide a lubricant or coolant through the passage.

7. The tool tip and tool body as set forth in claim 1, wherein the through hole is a countersunk hole having a larger portion and a smaller portion and a transition surface between the larger portion and the smaller portion, the securing end of the at least one fastener abutting against the transition surface.

8. The tool tip and tool body as set forth in claim 1, wherein the at least one fastener is two fasteners, the at least one through hole is two through holes, and the at least one threaded hole is two threaded holes.

9. The tool tip and tool body as set forth in claim 8, wherein the two fasteners, two through holes, and two threaded holes are disposed at equal radii about a central axis of the tool tip and the tool body.

10. The tool tip and tool body as set forth in claim 9, wherein the two fasteners, two through holes, and two threaded holes define an angle of 180° to each other measured from the central axis.

11. The tool tip and tool body as set forth in claim 8, wherein the two fasteners, two through holes, and two threaded holes define an angle of 180° to each other measured from the central axis.

12. A tool tip and tool body assembly, comprising:
 a tool tip having a first end for contacting a workpiece and a second end, the second end consisting essentially of a patterned surface of recesses and protrusions and at least one through hole extending through the tool tip from the second end;
 a tool body having a first end consisting essentially of a patterned surface corresponding to the patterned surface of the tool tip for mating with the patterned surface of the tool tip and at least one threaded hole adapted to align with the at least one through hole in the tool tip; and
 at least one fastner having a threaded end and a securing end, the fastner extending through the at least one through hole such that the securing end abuts against a surface in the at least one through hole, the threaded end mating with threads in the threaded hole,
 wherein torque is transmitted between the tool tip and the tool body solely by both the at least one fastner and the patterned surface of the tool tip and the patterned surface of the tool body, wherein the tool tip has a higher hardness than the tool body.

13. The tool tip and tool body as set forth in claim 5, wherein the tool body includes at least one third passage portion having a first end at a second end of the tool body and a second end at a point removed from the first end of the tool body, and at least one of the at least one second passage portions extends at an angle from a second end of at least one of the at least one of the at least one third passage portions to the first end of the tool body, and the tool tip includes at least one first passage portion aligned with the at least one of the at least one second passage portions and extending from the second end of the tool tip to a point removed from the second end of the tool tip, each set of aligned first and second passage portions defining a passage and being of sufficient size to provide a lubricant or coolant through the passage.

14. The tool tip and tool body assembly as set forth in claim 1, wherein the assembly is part of a rotating tool.

15. The tool tip and tool body assembly as set forth in claim 5, wherein the assembly is part of a rotating tool.

* * * * *